United States Patent
Maiyuran et al.

(10) Patent No.: US 6,845,432 B2
(45) Date of Patent: Jan. 18, 2005

(54) LOW POWER CACHE ARCHITECTURE

(75) Inventors: Subramaniam J. Maiyuran, Gold River, CA (US); Lyman Moulton, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 09/749,750

(22) Filed: Dec. 28, 2000

(65) Prior Publication Data

US 2002/0129201 A1 Sep. 12, 2002

(51) Int. Cl.[7] .............................................. G06F 12/00
(52) U.S. Cl. ....................... 711/154; 711/128; 711/133; 711/136; 711/156; 713/320; 713/322; 713/324
(58) Field of Search ................................. 711/154, 128, 711/136, 133, 156; 713/320, 322, 324

(56) References Cited

U.S. PATENT DOCUMENTS

| | | | | |
|---|---|---|---|---|
| 4,357,656 A | * | 11/1982 | Saltz et al. | 711/138 |
| 5,210,842 A | * | 5/1993 | Sood | 711/125 |
| 5,325,507 A | * | 6/1994 | Freitas et al. | 365/49 |
| 5,410,668 A | * | 4/1995 | Hilton | 711/139 |
| 5,423,014 A | * | 6/1995 | Hinton et al. | 711/3 |
| 5,432,947 A | * | 7/1995 | Doi | 713/320 |
| 5,495,617 A | * | 2/1996 | Yamada | 713/323 |
| 5,530,932 A | * | 6/1996 | Carmean et al. | 713/324 |
| 5,630,146 A | * | 5/1997 | Conary et al. | 713/322 |
| 5,632,038 A | * | 5/1997 | Fuller | 713/324 |
| 5,634,131 A | * | 5/1997 | Matter et al. | 713/322 |
| 5,666,513 A | * | 9/1997 | Whittaker | 711/118 |
| 5,666,537 A | * | 9/1997 | Debnath et al. | 713/322 |
| 5,682,515 A | * | 10/1997 | Lau et al. | 711/118 |
| 5,752,045 A | * | 5/1998 | Chen | 713/322 |
| 5,778,431 A | * | 7/1998 | Rahman et al. | 711/135 |
| 5,781,783 A | * | 7/1998 | Gunther et al. | 713/320 |
| 5,805,907 A | * | 9/1998 | Loper et al. | 713/300 |
| 5,809,532 A | * | 9/1998 | Eno et al. | 711/141 |
| 5,870,616 A | * | 2/1999 | Loper et al. | 713/324 |
| 5,901,322 A | * | 5/1999 | Herbst et al. | 713/322 |
| 5,913,223 A | * | 6/1999 | Sheppard et al. | 711/118 |
| 5,931,951 A | * | 8/1999 | Ando | 713/324 |
| 6,041,401 A | * | 3/2000 | Ramsey et al. | 712/43 |
| 6,115,793 A | | 9/2000 | Gruber | |
| 6,219,796 B1 | * | 4/2001 | Bartley | 713/320 |
| 6,307,281 B1 | * | 10/2001 | Houston | 307/31 |
| 6,381,671 B1 | | 4/2002 | Ayukawa et al. | |
| 6,427,188 B1 | * | 7/2002 | Lyon et al. | 711/122 |
| 6,442,667 B1 | * | 8/2002 | Shiell et al. | 711/207 |

(List continued on next page.)

FOREIGN PATENT DOCUMENTS

EP WO 97/37307 * 10/1997 ........... G06F/13/00

OTHER PUBLICATIONS

Albonesi, "Selective Cache Ways: On-Demand Cache Resource Allocation," pp 248–259, IEEE, Nov. 1999.*

(List continued on next page.)

Primary Examiner—Stephen Elmore
(74) Attorney, Agent, or Firm—Kenyon & Kenyon (57) ABSTRACT

In a processor cache, cache circuits are mapped into one or more logical modules. Each module may be powered down independently of other modules in response to microinstructions processed by the cache. Power control may be applied on a microinstruction-by-microinstruction basis. Because the microinstructions determine which modules are used, power savings may be achieved by powering down those modules that are not used. A cache layout organization may be modified to distribute a limited number of ways across addressable cache banks. By associating fewer than a total number of ways to a bank (for example, one or two ways), the size of memory clusters within the bank may reduced. The reduction in this size of the memory cluster reduces the power needed for an address decoder to address sets within the bank.

15 Claims, 6 Drawing Sheets

U.S. PATENT DOCUMENTS

| | | | |
|---|---|---|---|
| 6,449,694 B1 * | 9/2002 | Burgess et al. | 711/128 |
| 6,528,974 B1 * | 3/2003 | Mirov et al. | 323/267 |
| 6,608,476 B1 * | 8/2003 | Mirov et al. | 324/103 R |
| 6,684,298 B1 * | 1/2004 | Dwarkadas et al. | 711/128 |
| 2002/0129201 A1 | 9/2002 | Maiyuran et al. | |

OTHER PUBLICATIONS

Agarwal et al, "Column–Associative Caches: A Technique for Reducing the Miss Rate of Direct–Mapped Caches", Proceedings, The 20$^{th}$ Annual Intl Symposium on Computer Architecture, IEEE Computer Society, Technical Committee on Computer Architecture, Association for Computing Machinery SIGARCH, pp 169–190, San Diego, California, May 16–19, 1993.

Alexander et al, "Distributed Prefetch–buffer/Cache Design for High Performance Memory Systems", Proceedings, Second Intl Symposium on High–Performance Computer Architecture, IEEE Computer Society, Technical Committee on Computer Architecture, pp 254–263, San Jose, California, Feb. 3–7, 1996.

Burger et al, "The SimpleScaler Tool Set, Version 2.0", *Computer Sciences Department Technical Report*, No. 1342, The University of Wisconsin, Madison, Wisconsin, Jun. 1997.

Edmondson et al, "Internal Organization of the Alpha 21164, a 300–MHz 64–bit Quad–issue CMOS RISC Microprocessor", *Digital Technical Journal*, vol. 7, No. 1, pp 119–135, 1995.

Hill, Mark D., "A Case for Direct–Mapped Caches", *Computer*, pp 25–40, Dec. 1988.

Juan et al, "The Difference–bit Cache", Proceedings, The 23$^{rd}$ Annual Int'l Symposium on Computer Architecture, ACM SIGARCH, IEEE Computer Society, TCCA, pp 114–120, Philadelphia, Pennsylvania, May 22–24, 1996.

Kessler et al, "Inexpensive Implementation of Set–Associativity", Proceedings, The 16$^{th}$ Annual Intl Symposium on Computer Architecture, IEEE Computer Society Press, pp 131–139, 1989.

Rau et al, "Pseudo–Randomly Interleaved Memory", Proceedings, The 18$^{th}$ Annual Intl Symposium on Computer Architecture, Association for Computing Machinery, pp 74–83, Toronto, Canada, May 27–30, 1991.

Rivers et al, "On Effective Data Supply for Multi–Issue Processors", Proceedings, Intl Conference on Computer Design, VLSI in Computers and Processors, IEEE Computer Society Technical Committee on Design Automation, IEEE Circuits and Systems Society, pp 519–528, Austin, Texas, Oct. 12–15, 1997.

Sánchez et al, "A Locality Sensitive Multi–Module Cache with Explicit Management", Proceedings of the 1999 Intl Conference on Supercomputing, ICS '99, Rhodes, Greece.

Sohi et al, "High–Bandwidth Data Memory Systems for Superscalar Processors", ASPLOS–IV Proceedings, Fourth Intl Conference on Architectural Support for Programming Languages and Operating Systems, pp 53–62, Santa Clara, California, Apr. 8–11, 1991.

Wilson et al, "Increasing Cache Port Efficiency for Dynamic Superscaler Microprocessors", Proceedings, The 23$^{rd}$ Annual Intl Symposium on Computer Architecture, ACM SIGARCH, IEEE Computer Society, TCCA, pp 147–157, Philadelphia, Pennsylvania, May 22–24, 1996.

Wilson et al, "Designing High Bandwidth On–Chip Caches", The 24$^{th}$ Annual Intl Symposium on Computer Architecture, Conference Proceedings, ACM, pp 121–132, Denver, Colorado, Jun. 2–4, 1997.

Wilton et al, "An Enhanced Access and Cycle Time Model for On–Chip Caches", Digital WRL Research Report 93/5, Palo Alto, California, Jul. 1994.

Stanley, T., *Pentium® Pro Processor System Architecture*, Chapter 5, pp. 61–118, Addison–Wesley Developers Press, 1997.

Rivers et al, "On High–Bandwidth Data Cache Design for Multi–Issue Processors", IEEE, Proceedings, Micro–30, Dec. 1–3, 1997, Research Triangle Park, North Carolina.

Neefs et al, A Technique for High Bandwidth and Deterministic Low Latency Load/Store Accesses to Multiple Cache Banks, 6th Int'l. Symposium on High–Performance Computer Architecture HPCA–6, IEEE, 1999, Los Alamitos, California.

Calder et al, "Predictive Sequential Associative Cache", IEEE, Proceedings 2nd Int'l. Symposium on High–Performance Computer Architecture, Feb. 3–7, 1996, San Jose, California.

Cho et al, Decoupling Local Variable Accesses in a Wild-Issue Superscaler Processor, Proceedings of the 26th Annual Int'l. Symposium on Computer Architecture, May 1999.

* cited by examiner

PRIOR ART

FIG. 6
800
ADDRESS

LOW POWER CACHE ARCHITECTURE

BACKGROUND

The present invention relates to a cache architecture that contributes to reduced power consumption of integrated circuits. More particularly, the cache architecture permits units within the cache to be disabled on a microinstruction-by-microinstruction basis.

Issues of power consumption have become increasingly important for the design of integrated circuits. The power consumption of integrated circuits, particularly that of processors, has increased over the years with the historical increase clock speeds. Modern processors now consume so much power that the heat generated by the processors has become destructive. The increase in power consumption also contributes to reduced battery life in mobile computing applications.

Power management techniques are commonplace in the modern computer. Users of domestic personal computers recognize that computer monitors, disk drives and the like are disabled when not in use. However, such techniques are not able to keep pace with the ever increasing power demands made by newer generations of integrated circuits. Accordingly, there remains a need in the art for an integrated circuit architecture that contributes to reduced power consumption of the integrated circuit.

An internal cache may be perhaps the largest functional unit within a processor. In the Pentium Pro® processor, commercially available from Intel Corporation, an L2 cache may have a capacity to store 2 MB of data and may occupy approximately 60% of the processor's area when manufactured as an integrated circuit. If a power control technique could be applied to a processor's cache, it could achieve considerable power control savings for the chip overall.

It is known to disable (e.g. power down) a processor cache when it is not in use in order to save power. Such a technique, however, disables the cache entirely and can be used only when the cache has no operation to perform. As is known, a cache may have a high utilization rate. Accordingly, the known power conservation techniques for caches do not achieve significant reductions in power consumption.

No known power control scheme for a processor cache permits the cache to conserve power when in operation.

DETAILED DESCRIPTION

Embodiments of the present invention provide a processor cache in which cache circuits are mapped into one or more logical modules. Each module may be powered down independently of other modules. Caches typically operate according to microinstructions. For many microinstructions, certain modules will not participate in the cache operations. Power savings may be achieved by powering down modules on a microinstruction-by-microinstruction basis.

Figure 1:
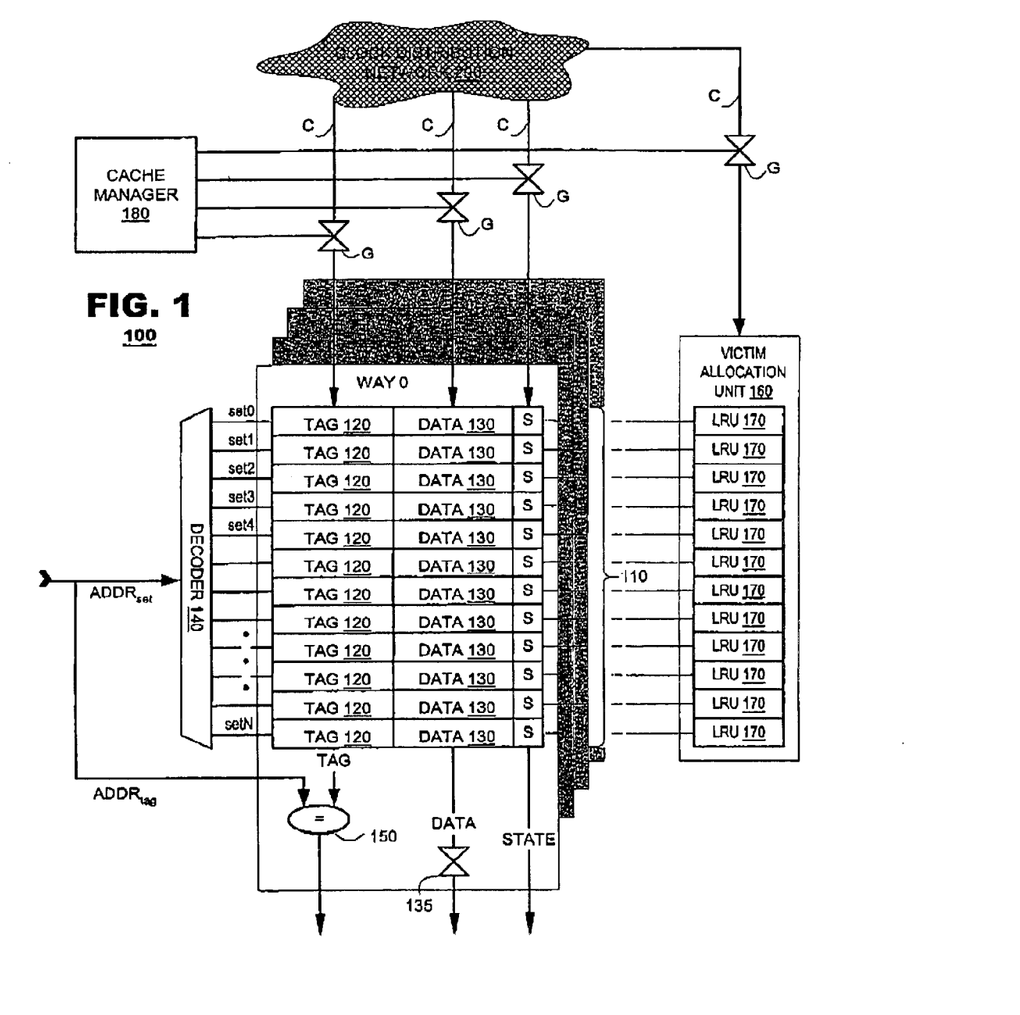
FIG. 1 is a block diagram of a processor cache according to an embodiment of the present invention.

FIG. 1 is a block diagram of a processor cache according to an embodiment of the present invention. According to the embodiment, the cache 100 may be populated into a plurality of cache entries 110. The embodiment of FIG. 1 illustrates the entries 110 organized into sets and ways. As shown in FIG. 1, way 0 may include a predetermined number N of cache entries. Each cache entry 110 may be organized into a tag field 120, a data field 130 and a state field (labeled "S"). Data to be stored in the cache 100 may be stored in the data fields 130 of the cache entries 110. Partial address information identifying a source of the data stored in a data field 130 may be stored in the tag field 120. Cache coherency state information may be stored in the state field S. For simplicity's sake, the architecture of a single way (way 0) is illustrated in FIG. 1; the architecture of way may extend to the other ways 1, 2, etc. In practice a cache may include fewer or more ways than the four ways shown in FIG. 1.

The cache 100 may include an address decoder 140. The address decoder 140 may have an input for a portion of address data (labeled $ADDR_{set}$). The address decoder 140 may have a plurality of outputs, one connected to each of the N cache entries 110 in each of the ways. The decoder 140, therefore, may define "sets" within the cache 110 (referenced with respect to output lines from the decoder 140). The decoder output labeled "set0," for example, may be connected to one cache entry 110 from each of the ways in the cache 100. Similarly, all other output lines from the decoder 140 may be connected to one cache entry 110 from each ways. Some processors may provide separate decoders for the tag fields 120 and cache fields 130 of a single cache entry 110 (embodiment not shown). In response to an address signal $ADDR_{set}$, the decoder 140 may enable W cache entries 110, where W represents the number of ways in the cache 100.

Each way may include a comparator 150 having a first input coupled to the tag fields 120 of the cache entries 110 within the respective way. The comparator 150 also may have a second input coupled to a second portion of an address input, labeled $ADDR_{tag}$. When in use, stored tag information from one of the cache entries 110 will be output to the comparator 150 in response to an output from the decoder 140. The comparator 150 may generate an output which is enabled when the stored tag data matches the $ADDR_{tag}$ input. The output from a comparator 150 may control a transmission gate 135 on the output from data fields 130 to permit data read from the data fields 130 to propagate from the way in response to a tag match.

The cache 100 also may include a victim allocation unit 160, populated by a plurality of eviction control registers (LRUs) 170. The victim allocation unit 160 may have an LRU 170 for each set in the cache 100. When new data is to be written to a particular set (say, set0) in the cache 100 and all sets contain valid data, data must be evicted from one of the ways before the new data may be stored. For each set, the LRUs 170 identify one of the ways (called, a "victim way") as the next data to be evicted. Typically, eviction occurs according to a least-recently-used, round-robin or other conventional basis.

A cache 100 may include a cache manager 180, which, typically, is a state machine. The cache manager 180 may receive data requests from other processor components (not shown) relating to the reading or writing of data to/from the cache 100. The cache manager 180 may operate in accordance with several micro-operations (commonly, "UOPs") to accomplish this function. Known UOPs include:

Evict, causing data to be evicted from a cache entry 110;

Read Line, LRU Update ("RLU"), causing data to be read from an addressed cache entry and updating the LRU register 170 based on new use;

Tag Inquiry ("TI"), reading tag data 120 from addressed cache entries 110 for comparison with input $ADDR_{tag}$ data;

Tag Read/Data Read ("TRR"), reading the tag field 120 and data field 130 of addressed cache entries 110;

Tag Write ("TW"), writing data to the tag field 120;

Tag Write/Data Read ("TWR"), reading data 130 from a cache entry 110 and writing data to the tag field 120 thereof; and Tag Write/Data Write ("TWW"), writing data to the tag field 120 and data field 130 of an addressed cache entry 110.

The cache manager 180 typically manages the operation of the cache 100 to fulfill the data requests via control paths to each field 120, 130, S of each cache entry 110 (not shown in FIG. 1 for simplicity).

The cache 100 operates in synchronism with a system clock. Individual components within the cache (the cache entries 100, decoder 140, comparator 150, LRUs 170) operate in accordance with clock signals derived from the system clock. A clock distribution network 200 is provided within the processor to distribute the clock signals throughout the cache. In this regard, the operation and structure of a set-associative cache is well-known.

According to an embodiment, the cache manager 180 may interact with the clock distribution network 200 to selectively enable or disable logical modules in response to UOPs. For example, the clock distribution network 200 may be coupled to each tag field 120, data field 130 and state fields S of each of the ways by a respective clock line C. In an embodiment, transmission gates G may be provided on the clock lines C. The transmission gates G may be controlled by the cache manager 180 to selectively enable or disable the clock lines. Clock lines to cache entries 110 in a first way (say, way 0) may be controlled independently of clock lines to cache entries 110 in a second way (way 1). A clock line C of the victim allocation unit 160 similarly may be provided with a transmission gate G under control of the cache manager 180.

Table 1 below identifies the settings of each module for each UOP:

When the data request is a read operation, the cache manager 180 may generate an RLU UOP 310. The RLU UOP 310 may energize the tag fields 120, data fields 130 and state fields S of all ways in the cache 100 (FIG. 1) as well as the LRU 170 in the set identified by the $ADDR_{set}$ so that data may be read from them. As explained, tag data 120 is read from each way and compared with the $ADDR_{tag}$ information. A cache hit/miss decision may be made from the comparison. A cache "hit" may be signaled when one of the comparators 150 indicates a match and state data S indicates the presence of valid data in the data field 130; it means that the requested data is located within the cache 100. Otherwise, the request is said to "miss" the cache.

The LRU 170 identifies the next way that will be selected as a victim. If a cache miss occurs, new data eventually may be stored in the cache 100. The cache manager 180 may determine from the state information of the victim way whether the victim is dirty or not. "Dirty" data is data that has been modified; it may be the most current copy of the data in the system. Dirty data is protected against destruction. If the victim data is dirty, the cache manager 180 may generate an Evict UOP 320 to evict the dirty data from the cache 100 without destroying it. During processing of the Evict UOP 320, only a victim way (say, way 0) may be enabled. All other ways and the victim allocation unit 160 may be powered down. Thereafter, or if the victim data was not dirty, the cache manager 180 may return to the idle state 300.

When the data request is a data replacement instruction, the cache manager 180 may issue a TWW UOP 330. The TWW UOP 330 may cause the tag field 120, the data field 130 and the state field S of a single way, called the "target way," to be energized so that new data can be written to it. All other ways and the victim allocation unit may be powered down during the TWW UOP 330. The cache manager 180 may identify the target way from the data replacement instruction itself. Thereafter, the cache manager 180 may return to the idle state 300.

When the data request is a write instruction issued pursuant to a data eviction from a higher-level cache (not shown), the cache manager 180 may issue a TI UOP 340. The TI UOP 340 may energize the tag fields 120 and state fields S of all ways in the cache 100. The data fields 130 throughout the cache 100 and the victim allocation unit 160 may be powered down during the TI UOP 340. The cache manager 180 may determine a hit or miss based upon outputs from the way comparators 150 and the state fields. If a hit occurs, the cache manager 180 may issue a TWW

TABLE 1

| Microinstructions (UOPs) | Tag 120 | Data 130 | State S | LRU 170 | Number Of Ways |
|---|---|---|---|---|---|
| Evict | On | On | On | Off | One |
| Read Line, LRU Update ("RLU") | On | On | On | On | All |
| Tag Inquiry ("TI") | On | Off | On | Off | All |
| Tag Read/Data Read ("TRR") | On | On | On | Off | One |
| Tag Write ("TW") | On | Off | On | Off | One |
| Tag Write/Data Read ("TWR") | On | On | On | Off | One |
| Tag Write/Data Write ("TWW") | On | On | On | Off | One |

By disabling cache components such as ways, tag fields 120, data fields 130, state fields S and LRUs 170 on a UOP-by-UOP basis, the cache architecture 100 achieves considerable power conservation over known alternatives.

Figure 2:
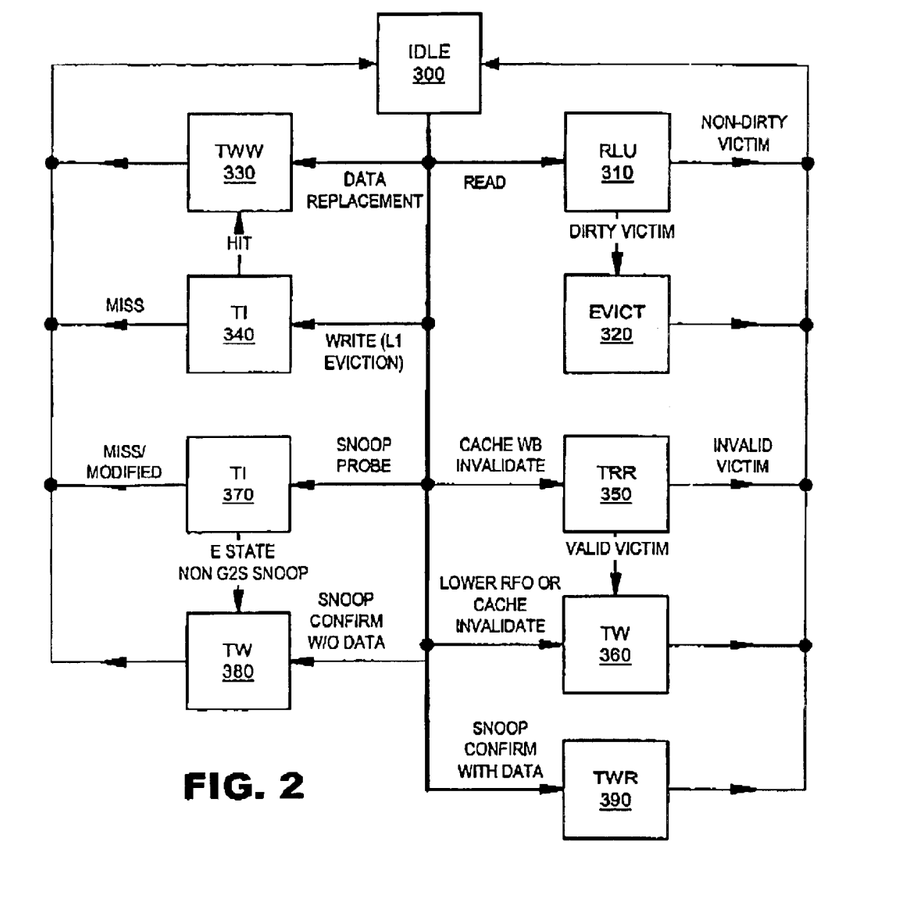
FIG. 2 is a state diagram illustrating operation of the cache manager in accordance with an embodiment of the present invention.

FIG. 2 is a state diagram illustrating operation of the cache manager 180 (FIG. 1) in accordance with an embodiment. The cache manager 180 may begin operation in an idle state 300 and transition out of the idle state 300 in response to data request.

UOP 330, causing new data to be written to the tag field 120 and data field 130 of the cache entry 110 that cause the hit. All other ways and the victim allocation unit may be powered down during the TWW UOP 330. Thereafter, the cache manager 180 may return to the idle state 300.

When the data request is a cache writeback invalidate instruction, the cache manager 180 may issue a TRR UOP 350. The TRR UOP 350 may cause data from the tag field 120, the data field 130 and the state field S of an addressed cache entry 110 in a victim way to be energized. All other ways may be powered down during processing of the TRR UOP 350. The cache manager 180 may identify the victim way from the data request itself. From the state field S, the cache manager 180 may determine if the victim cache entry 110 is valid or non-valid. If the victim cache entry 110 is valid, the cache manager 180 may generate a TW UOP 360 causing new state data, designating an invalid state, and possibly tag information, to be written to the cache entry 110. All other ways and the victim allocation unit 160 may be powered down during processing of the TW UOP 360. Thereafter, or if the victim cache entry 110 was invalid, the cache manager 180 may return to the idle state 300.

If the cache 100 (FIG. 1) were positioned within a cache hierarchy above other higher-level cache, a data request that indicates a write of data pursuant to a Read For Ownership ("RFO") request need not cause data to be written in the cache 100. Typically, the data is being written to other higher-level caches (not shown) so the data can be modified. Eventually, the data may be written to the cache 100 pursuant to an eviction from the higher-level cache. Accordingly, in an embodiment, when the data request is a write of data pursuant to an RFO, the cache manager 180 may generate a TW UOP 360, causing a write of tag and state information in the tag field 120 and state field S of a cache entry 110 in a single way. All other ways and the victim allocation unit 160 may be powered down during processing of the TW UOP 360. Thereafter, the cache manager 180 may return to the idle state 300.

If the data request is a cache invalidate command, the cache manager 180 also may generate a TW UOP 360. The TW UOP 360 may cause a write of tag and state information in the tag field 120 and state field S of a cache entry 110 in a single way. The cache manager 180 may determine the target way from the cache invalidate command itself. All other ways and the victim allocation unit 160 may be powered down during processing of the TW UOP 360. Thereafter, the cache manager 180 may return to the idle state 300.

If the data request is a snoop probe, the cache manager 180 may genarate a TI UOP 370. The TI UOP 370 may cause data to be read from the tag fields 120 and S from addressed cache entries 110 in all ways of the cache 100. The data fields 130 throughout the cache 100 and the victim allocation unit 160 may be powered down during the TI UOP 370. Following the TI UOP 370, if a way comparator 150 indicates a tag match, the cache manager may generate a TW UOP 380 if the state information from the matching cache entry 110 indicate that the data were held in exclusive state ("E state" in the drawings) or if the snoop probe were not a Go-to-Shared snoop ("G2S" in the drawings). The TW UOP 380 may update the data held in the state field S of the matching way. All other ways and the victim allocation unit 160 may be powered down during processing of the TW UOP 380. Thereafter, the cache manager 180 may return to the idle state 300. Following the TI UOP 370, if the state information from the matching cache entry 110 indicates that the data is invalid or modified, the cache manager 180 may return to the idle state 300.

If the data request is a snoop confirm command and no data is to be transferred via an implicit writeback, the cache manager 180 may generate a TW UOP 380. The TW UOP 380 may cause data to be written to the state field S from an addressed cache entry 110 in a single way of the cache 100. All other ways and the victim allocation unit 160 may be powered down during processing of the TW UOP 380. Thereafter, the cache manager 180 may return to the idle state 300.

If the data request is a snoop confirm command and data is to be transferred via an implicit writeback, the cache manager 180 may generate a TWR UOP 390. The TWR UOP 390 may cause data to be read from a data field 130 and new state data to be written to the state field S in a single way of the cache 100. All other ways and the victim allocation unit 160 may be powered down during processing of the TWR UOP 390. Thereafter, the cache manager 180 may return to the idle state 300.

The foregoing description illustrates operation of a cache 100 that integrates power control techniques of the present embodiments with UOPs of known caches. It is believed that the foregoing embodiments achieve greater power conservation in a processor system than was available by other known power control techniques.

Additional power conservation may be achieved by the cache architecture 100 by enhancing the UOPs employed by such a cache. Accordingly, the following description presents embodiments of the present invention that redefine cache UOPs and their uses to improve the power control techniques even further.

According to an embodiment, the cache manager 180 may interact with the clock distribution network 200 to selectively enable or disable logical modules in response to UOPs. Table 2 below identifies the settings of each module for each UOP:

TABLE 2

| Microinstructions (UOPs) | Tag 120 | Data 130 | State S | LRU 170 | Number Of Ways |
|---|---|---|---|---|---|
| Data Write ("DW") | Off | On | On | Off | One |
| Evict | On | On | On | Off | One |
| Read Line, LRU Update ("RLU") | On | On | On | On | All |
| Tag inquiry ("TI") | On | Off | On | Off | All |
| Tag Read/Data Read ("TRR") | On | On | On | Off | One |
| Tag Write ("TW") | On | Off | On | Off | One |
| Tag Invalidate ("TWI") | Off | Off | On | Off | One |
| Tag Write/Data Read ("TWR") | On | On | On | Off | One |
| Tag Write/Data Write ("TWW") | On | On | On | Off | One |

Figure 3:
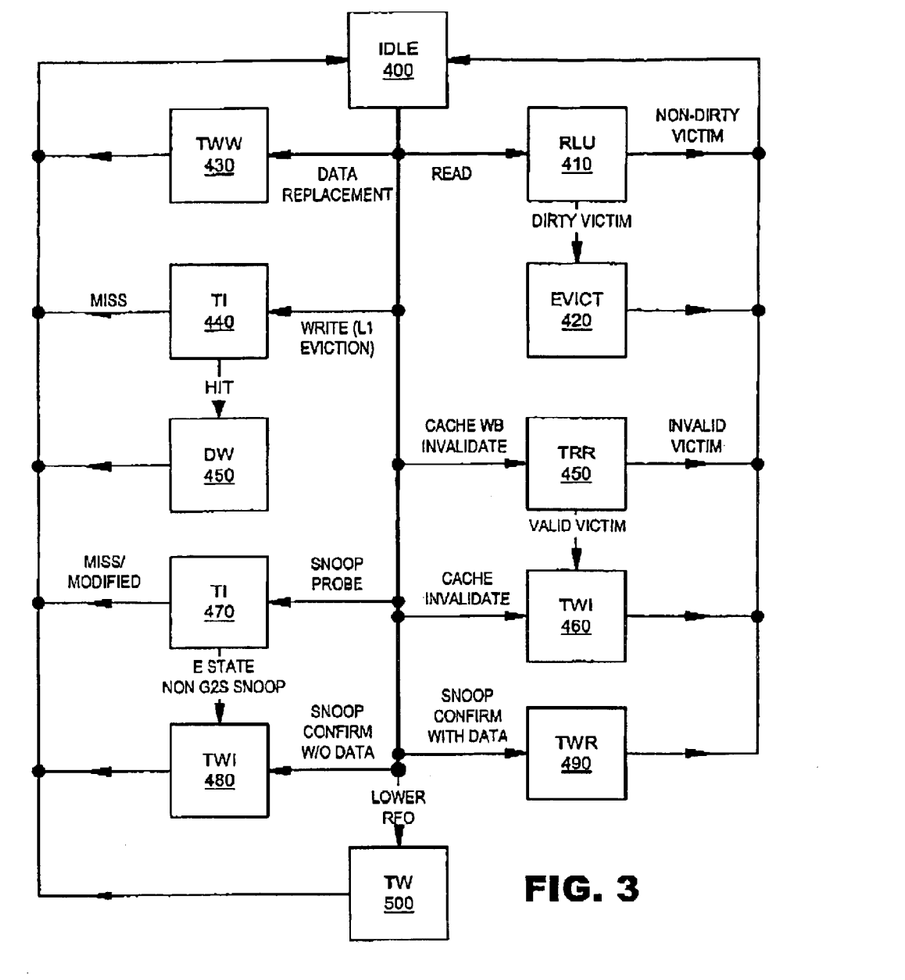
FIG. 3 is a state diagram illustrating operation of the cache manager in accordance with an embodiment of the present invention.

FIG. 3 is a state diagram illustrating use of the UOPs, according to an embodiment of the present invention. According to this embodiment, the cache manager 180 may begin operation in an idle state 400 and transition out of the idle state 400 in response to a data request.

When the data request is a read operation, the cache manager 180 may generate an RLU UOP 410. The RLU UOP 410 may energize the tag fields 120, data fields 130 and state fields S of all ways in the cache 100 (FIG. 1) as well as the LRU 170 in the set identified by the $ADDR_{set}$ so that data may be read from them. A cache hit/miss decision may be made from tag comparisons in each of the ways. If a cache miss occurs, the cache manage 180 may determine, from the state information, a victim way (identified by the LRU 170). If the victim way is dirty, the cache manager 180 may generate an Evict UOP 420 to evict the dirty data from the cache 100. The Evict UOP 420 may cause only one of the ways to be energized; all other ways and the victim allocation unit 160 may be powered down. Thereafter, or if the victim data was not dirty, the cache manager 180 may return to the idle state 400.

When the data request is a data replacement instruction, the cache manager 180 may issue a TWW UOP 430. The TWW UOP 430 may cause the tag field 120, the data field 130 and the state field S of a target way to be energized so that new data can be written to it. All other ways and the victim allocation unit may be powered down during the TWW UOP 330. The cache manager 180 may identify the target way from the data replacement instruction itself. Thereafter, the cache manager 180 may return to the idle state 400.

When the data request is a write instruction issued pursuant to a data eviction from a higher-level cache (not shown), the cache manager 180 may issue a TI UOP 440. The TI UOP 440 may energize the tag fields 120 and state fields S of all ways in the cache 100. The data fields 130 throughout the cache 100 and the victim allocation unit 160 may be powered down during the TI UOP 340. The cache manager 180 may determine a hit or miss based upon outputs from the way comparators 150 and the state fields. If a hit occurs, the cache manager 180 may issue a DW UOP 430, causing new data to be written to the data field 130 and state field S of the cache entry 110 that caused the hit. The tag field 120 need not be energized. Further, all other ways and the victim allocation unit 160 may be powered down. Thereafter, the cache manager 180 may return to the idle state 400.

When the data request is a cache writeback invalidate instruction, the cache manager 180 may issue a TRR UOP 450. The TRR UOP 450 may cause data from the tag field 120, the data field 130 and the state field S of an addressed cache entry 110 in a victim way to be energized. All other ways may be powered down during processing of the TRR UOP 450. The cache manager 180 may identify a victim way from the data request itself. From the state field S, the cache manager 180 may determine if the victim cache entry 110 is valid or non-valid. If the victim cache entry 110 is valid, the cache manager 180 may generate a TWI UOP 460 causing new state information, designating an invalid state, to be written to the cache entry 110. The tag field 120 and the data field 130 in the victim way need not be energized. All other ways and the victim allocation unit 160 may be powered down during the TWI UOP 460. Thereafter, or if the victim cache entry 110 was invalid, the cache manager 180 may return to the idle state 400.

If the data request is a cache invalidate command, the cache manager 180 also may generate a TWI UOP 460. The TWI UOP 460 may cause new state information, designating an invalid state, to be written to the cache entry 110 of a single way. The cache manager 180 may determine the target way from the cache invalidate command itself. All other ways and the victim allocation unit 160 may be powered down during processing of the TWI UOP 460. Thereafter, the cache manager 180 may return to the idle state 400.

If the data request is a snoop probe, the cache manager 180 may generate a TI UOP 470. The TI UOP 470 may cause data to be read from the tag fields 120 and state fields S from addressed cache entries 110 in all ways of the cache 100. The data fields 130 throughout the cache 100 and the victim allocation unit 160 may be powered down during the TI UOP 370. Following the TI UOP 470, if a way comparator 150 indicates a tag match, the cache manager may generate a TWI UOP 480 if the state information from the matching cache entry 110 indicates that the data were held in exclusive state or if the snoop probe were not a Go-to-Shared snoop. The TWI UOP 480 may update the data held in the state field S of the matching cache entry 110. The tag field 120 and the data field 130 in the matching way may be powered down. Further, all other ways and the victim allocation unit 160 may be powered down. Thereafter, the cache manager 180 may return to the idle state 400. Following the TI UOP 470, if the state information from the matching cache entry 110 indicates that the data is invalid or modified, the cache manager 180 may return to the idle state 400.

If the data request is a snoop confirm command and no data is to be transferred via an implicit writeback, the cache manager 180 may generate a TWI UOP 480. The TWI UOP 480 may cause data to be written to the state field S from an addressed cache entry 110 in a single way of the cache 100. The tag field 120 and the data field 130 in the matching way may be powered down. Further, all other ways and the victim allocation unit 160 may be powered down. Thereafter, the cache manager 180 may return to the idle state 400.

If the data request is a snoop confirm command and data is to be transferred via an implicit writeback, the cache manager 180 may generate a TWR UOP 490. The TWR UOP 490 may cause data to be read from a data field 130 and new state data to be written to the state field S in a single way of the cache 100. All other ways and the victim allocation unit 160 may be powered down during processing of the TWR UOP 490. Thereafter, the cache manager 180 may return to the idle state 400.

When the data request is a write of data pursuant to an RFO, the cache manager 180 may generate a TW UOP 500, causing a write of tag and state information in the tag field 120 and state field S of a cache entry 110 in a single way. All other ways and the victim allocation unit 160 may be powered down during processing of the TW UOP 500. Thereafter, the cache manager 180 may return to the idle state 300.

In the foregoing embodiments, the cache manager 180 may generate an RLU UOP in response to a read request. The RLU UOP, as described, may cause cache entries 110 from all ways to be energized in their entirety—the tag field 120, the data field 130 and the state field S—in addition to the LRU 170 in the victim allocation unit 160. This permits a parallel read of all data fields 130 in the cache. If a comparator 150 and state data S indicates a tag match, the contents of the data field 130 of the matching way may be used without delay. Although the parallel read of data from all ways provides a very fast way of accessing requested data, it consumes unnecessary power.

Figure 4:
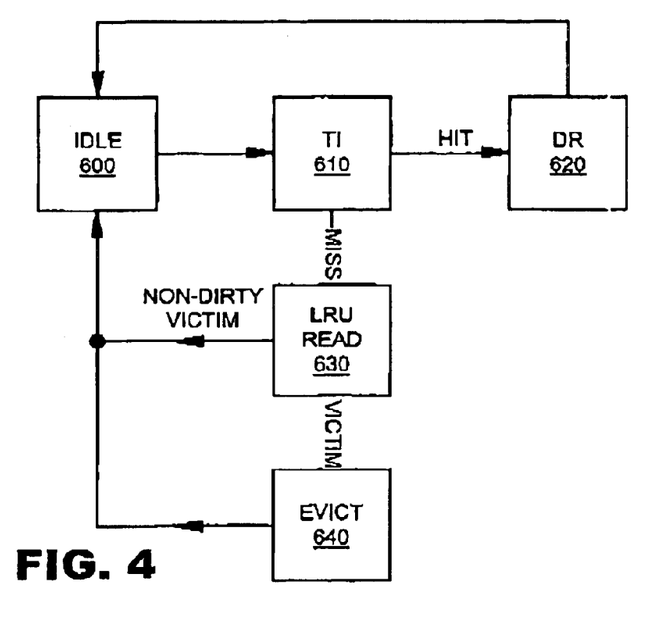
FIG. 4 is a state diagram illustrating response to a read request in accordance with an embodiment of the present invention.

FIG. 4 is a state diagram illustrating response to a read request in accordance with an embodiment of the present invention. In this embodiment, a cache manager may advance from an idle state 600 and issue a TI UOP 610 in response to the read request. As noted, a TI UOP 610 may cause data to be read from the tag fields 120 and state fields S of all ways in the cache 100. The data fields 130 may be powered down during the TI UOP 610. From the tag and state data, a determination may be made whether the request hit the cache.

If the request hit the cache 100, the cache manager may generate a data read UOP ("DR") 620 causing data to be read from a data field 130 in the one way that generate the tag match. During the DR UOP 620, the tag field 120 and state field S of the matching way may be powered down. Also, all other ways may be powered down. The victim allocation unit 160 may remain powered to be updated. Thereafter, the cache manager 180 may return to the idle state.

If the data request missed the cache, the cache manager 180 may generate an "LRU Read" UOP 630 causing data to be read from the victim allocation unit 160. All ways may be powered down during the LRU Read UOP 630. The victim allocation unit 160 may identify a victim way. From the state information read in the TI UOP 610, the cache manager 180 may determine whether the victim data is dirty or not dirty. If the victim data is dirty, the cache manager may generate an Evict UOP 640. The Evict UOP 640 may occur as in prior embodiments. Thereafter, or if the victim data was not dirty, the cache manager 180 may return to the idle state.

The embodiment of FIG. 4 benefits from reduced power consumption for read requests than in prior embodiments but at the cost of a slightly increased latency for read request. In the prior embodiments operating in accordance with an RLU UOP, reading data fields 130 from cache entries 110 that did not have a tag match wastes power. By contrast, the embodiment of FIG. 4 reads data from a data field 130 only after a tag match identifies a way that may store the requested data. Data is not read from the other ways.

Figure 5:
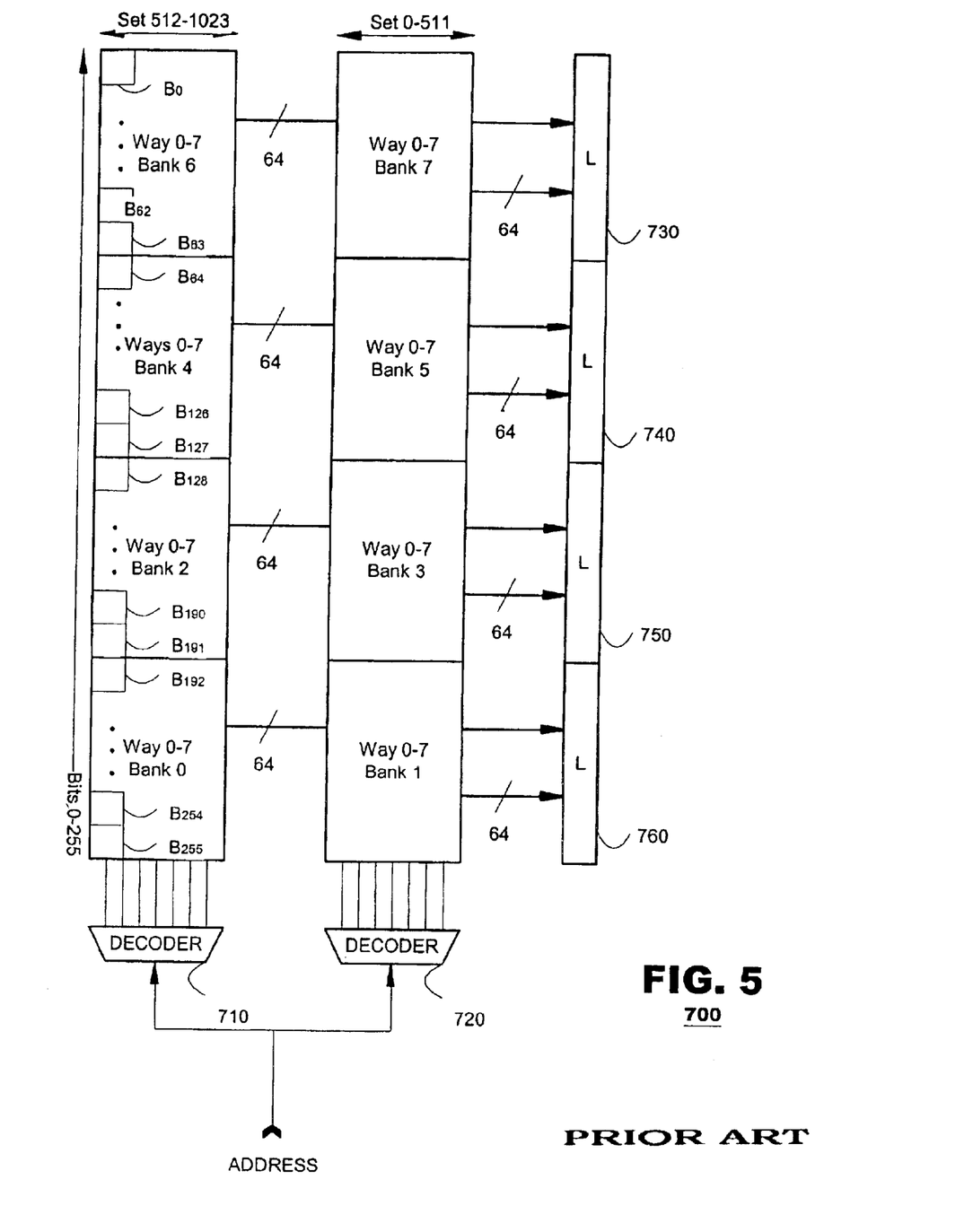
FIG. 5 is a block diagram illustrating cache organization according to conventional techniques.

Block diagrams of caches, such as the diagram of FIG. 1, are useful to understand the logical structure and operation of a cache. While such diagrams accurately describe the logical structure of a cache, they do not describe a cache at the circuit level. As is known, when the circuits of a cache are fabricated in an integrated circuit, memory cells of the various ways often are inter-mixed spatially and organized into banks to conserve area in the integrated circuit. To conserve power, embodiments of the present invention provide an alternate organization scheme for cache layouts. FIG. 5 is a block diagram illustrating cache organization according to conventional techniques. Although the dimension of a cache 700 may vary in the number of sets, ways and the size of cache entries, for illustrative purposes, the cache of FIG. 5 is shown as having 1024 sets, eight ways and cache entries having 256 bits. The cache is also shown organized into eight different banks. Address decoders 710, 720 may select one of the sets in response to an input address signal. In FIG. 5, although two address decoders are shown, only one of the sets 0–1023 will be selected in response to an address signal. Addressed data may propagate from the banks to a set of latches 730–760. From the latches 730–760, the data may be read out from the cache 700.

As is known, within a set, memory cells from each of the ways 0–7 may be co-located. Thus, memory cells associated with the most significant bit from each of the eight ways may be provided in a cluster (shown as $B_{255}$) in the integrated circuit layout. Memory cells associated with a next most significant bit may be provided in a second cluster $B_{254}$. This architecture may repeat for each bit position concluding with a cluster of memory cells for the least significant bit position $B_0$ in the cache. The architecture may span across multiple banks in the cache 700. Thus, for set 1023, clusters $B_{255}$–$B_0$ are shown extending across banks 0, 2, 4 and 6. Every bank 0–7, however, stores data from each of the ways. As noted, this architecture conserves area in an integrated circuit.

In a conventional cache, when operating upon a target way in the cache, an address decoder must drive a selection signal with sufficient energy to power not only the one target way (say, way 0), but also all other ways in the cache 700. The memory cells are provided in clusters $B_{255}$–$B_0$. No prior technique permitted an address decoder to select only a portion of a cluster $B_{255}$.

Figure 6:
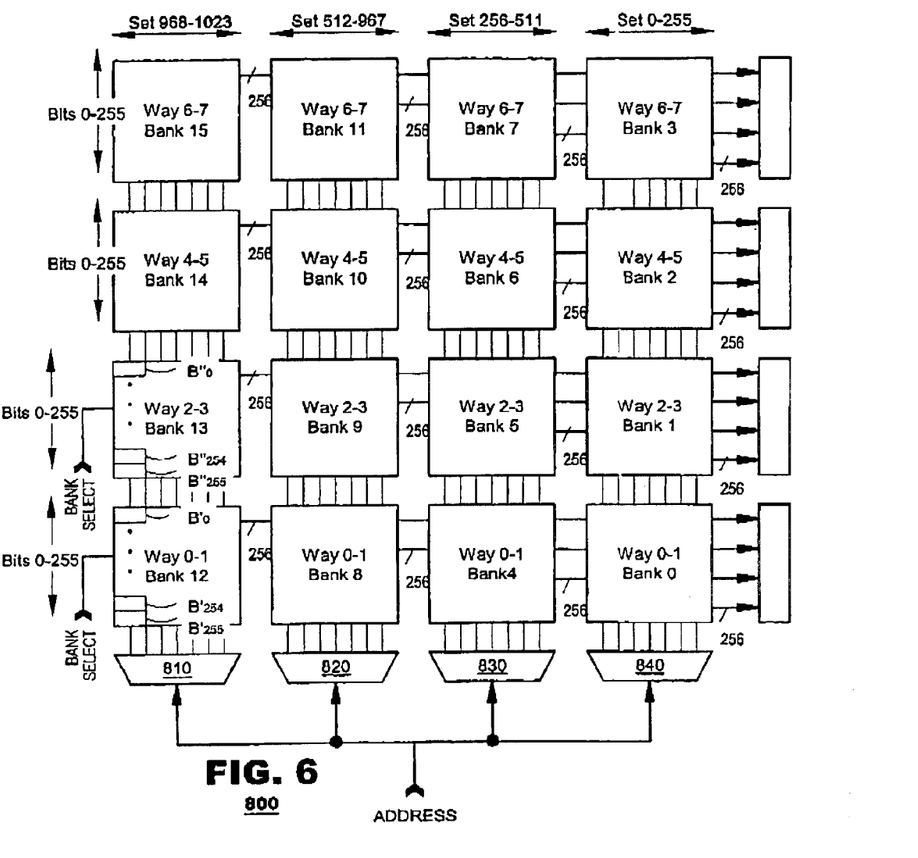
FIG. 6 is a block diagram illustrating cache organization according to an embodiment of the present invention.

FIG. 6 is a block diagram illustrating cache organization according to an embodiment of the present invention. For illustrative purposes, the cache 800 is shown as having the same dimension as the cache of FIG. 5—1024 sets, eight ways and cache entries having 256 bits. In this embodiment, a cache 800 also may be populated by a number of banks. Sixteen banks are shown in the example of FIG. 6. In this example, however, cache entries may be distributed throughout the banks in a manner consistent with the power conservation techniques described above.

According to an embodiment, each bank 0–16 may store data from less than the total number of ways in the cache. For example, as shown in FIG. 6, data from only two ways 0–1 are shown as stored in banks 0, 4, 8 and 12. Each bank may include clusters of memory cells from respective sets of each of the ways associated with the respective bank. Thus, bank 12 is shown as having clusters $B'_{255}$–$B'_0$ each of which would include two memory cells, one from a respective bit position in way 0 and another from a respective bit position in way 1. Bank 13 may have a similar structure. Each cluster $B''_{255}$–$B''_0$ may include two memory cells, one from a respective bit position in way 2 and another from a respective bit position in way 3. The structure may be repeated throughout the remaining banks in the cache.

Each bank also may be driven by a respective bank select signal. When disabled, it prevents the respective bank from responding to address signals from the address decoders. The clusters $B'_{255}$-$B'_0$ and $B''_{255}$-$B''_0$ each are one fourth the size of corresponding clusters $B_{255}$-$B_0$ in FIG. 5. Thus, the architecture of the present invention permits the address decoders to generate set selection signals with less power when compared with, for example, the cache of FIG. 5.

As may be appreciated, the structure of FIG. 6 conserves power but at the cost of additional area on the integrated circuit. In FIG. 5, when data is read from an addressed bank, only 256 data lines are required to read data from the eight ways. By contrast, in FIG. 6, the number of data lines associated with the eight ways increase by a factor of 4. Further, additional control logic, such as the bank select signals, may be provided to implement the control functions described herein.

The principles of the present invention, of course, are not limited to the example shown in FIG. 6. Instead of having two ways provided in each bank (e.g. ways 0-1 for bank 12), it is permissible to have a single way provided in each bank or, alternatively, any number of ways provided per bank up to one-half the total number of ways in the cache. Each implementation achieves a different amount of power conservation. In practice, however, power conservation is but one design objective which will be balanced by competing objectives to conserve circuit area and to maintain simplicity in design.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A cache control method comprising:
   in response to a data request, generating at least one microinstruction within a cache,
   disabling predetermined portions of the cache based on the microinstruction, wherein, when the data request is a read request:
      a first microinstruction causes data to be read from all ways in the cache, and
      if the read request hits the cache, a second microinstruction causes data to be read from a target way, all other ways being disabled during performance of the second microinstruction.

2. The cache control method of claim 1, further comprising:

reading data from a victim allocation unit during performance of the first microinstruction and disabling the victim allocation unit during performance of the second microinstruction.

3. A cache control method comprising:

in response to a data request, generating a microinstruction within a cache, disabling predetermined portions of the cache based on the microinstruction, wherein, when the data request is a data replacement request, the microinstruction causes data to be written to a tag field and data field in a single way, all other ways being disabled during performance of the microinstruction.

4. A cache control method comprising:

in response to a data request, generating at least one microinstruction within a cache, disabling predetermined portions of the cache based on the microinstruction, wherein, when the data request is a write request made pursuant to an eviction from higher level cache:

a first microinstruction causes data to be read from tag fields from all ways of the cache, all other fields in the ways being disabled during performance of the first microinstruction, and if the data request hits the cache, a second microinstruction may energize a tag field and data field of a matching way, all other ways being disabled during performance of the second instruction.

5. The cache control method of claim 4, wherein all other fields of the cache entry are disabled during performance of the second microinstruction.

6. A cache control method comprising:

in response to a data request, generating at least one microinstruction within a cache, disabling predetermined portions of the cache based on the microinstruction, wherein, when the data request is a cache writeback invalidate instruction;

a first microinstruction causes a victim way to be enabled, all other way being disabled during performance of the first microinstruction, and if an addressed cache entry in the victim way stores valid data, a second microinstruction causes data to be written in a state field of the cache entry, all other ways being disabled during performance of the second microinstruction.

7. A cache control method comprising:

in response to a data request, generating a microinstruction within a cache, disabling predetermined portions of the cache based on the microinstruction, wherein, when the data request is a cache invalidate request, the microinstruction causes data to be written in a state field of an addressed cache entry in a target way, all other ways being disabled during performance of the microinstruction.

8. The cache control method of claim 7, wherein all other fields of the cache entry are disabled during performance of the microinstruction.

9. A cache control method comprising:

in response to a data request, generating a microinstruction within a cache, disabling predetermined portions of the cache based n the microinstruction, wherein, when the data request is a write pursuant to a read-for-ownership request issued by higher level cache, the microinstruction causes data to be written in a tag field and a state field of an addressed cache entry in a target way, all other ways being disabled during performance of the microinstruction.

10. The cache control method of claim 9, wherein all other fields of the addressed cache entry are disabled during performance of he microinstruction.

11. A cache control method comprising:

in response to a data request, generating a microinstruction within a cache, disabling predetermined portions of the cache based on the microinstruction, wherein, when the data request is a snoop probe, the microinstruction causes data to be read from tag fields and state fields through all ways in the cache, all other fields throughout the cache being disabled during performance of the microinstruction.

12. The cache control method of claim 11, wherein, if the data request hits the cache and state data of a matching cache entry represents exclusive state, a second microinstruction causes data to be written to a state field of the matching cache entry, all other ways are disabled during performance of the second microinstruction.

13. The cache control method of claim 11, wherein, if the data request hits the cache and the snoop probe is not a Go-to-Shared snoop, a second microinstruction causes data to be written to a state field of the matching cache entry, all other ways are disabled during performance of the second microinstruction.

14. A cache control method comprising:

in response to a data request, generating a microconstruction within a cache, disabling predetermined portions of the cache based on the microinstruction, wherein, when the data request is a snoop confirm request with associated data, the microinstruction causes data to be read from a data field of a cache entry in a single way and data to be written to a state field of the cache entry, all other ways are disabled during performance of the microinstruction.

15. A cache control method comprising:

in response to a data request, generating a microinstruction within a cache, disabling predetermined portions of the cache based on the microinstruction, wherein, when the data request is a snoop confirm request with no associated data, the microinstruction causes data to be written to a state field of a cache entry in a single way, all other ways are disabled during performance of the microinstruction.

* * * * *

UNITED STATES PATENT AND TRADEMARK OFFICE
CERTIFICATE OF CORRECTION

PATENT NO. : 6,845,432 B2  Page 1 of 1
APPLICATION NO. : 09/749750
DATED : January 18, 2005
INVENTOR(S) : Maiyuran et al.

It is certified that error appears in the above-identified patent and that said Letters Patent is hereby corrected as shown below:

Title page item (75) Inventors: Add -- Salvador Palanca, Gold River, CA (US) and
Satish Damaraju, Rancho Cardova, CA (US) --

| Column | Line | |
|---|---|---|
| 11 | 45 | Change "all other way being disabled," to -- all other ways being disabled --; |

Signed and Sealed this

Seventh Day of September, 2010

David J. Kappos
*Director of the United States Patent and Trademark Office*